United States Patent [19]

Webster et al.

[11] 3,833,863

[45] Sept. 3, 1974

[54] STYRYL AND ARYLBUTADIENYL DYE LASERS

[75] Inventors: Frank G. Webster; William C. McColgin, both of Rochester, N.Y.

[73] Assignee: Eastman Kodak Company, Rochester, N.Y.

[22] Filed: Dec. 27, 1971

[21] Appl. No.: 212,654

[52] U.S. Cl........ 331/94.5, 252/301.2 R, 260/240.9
[51] Int. Cl.............................................. H01s 3/00
[58] Field of Search........... 260/240.9; 252/301.2 R; 331/94.5

[56] References Cited
UNITED STATES PATENTS

| | | | |
|---|---|---|---|
| 2,734,900 | 2/1956 | Heseltine | 260/240.5 |
| 3,521,187 | 7/1970 | Snavely et al. | 252/301.2 R; 331/94.5 |
| 3,541,470 | 11/1970 | Lankard et al. | 252/301.2 R |

FOREIGN PATENTS OR APPLICATIONS 1,502,822  10/1967  France

OTHER PUBLICATIONS

Brooker et al., (I) J. Am. Chem. Soc. 67(1945) p. 1875–1889.
Brooker, et al., (II) J. Am. Chem. Soc. 64(1942) p.199–209.
Stimulated Emission of Solutions of Cyanine Dyes, Soviet Physics, Doklady, Vol. 13, No. 1, July 1968, pages 53–55.

*Primary Examiner*—Daniel E. Wyman
*Assistant Examiner*—A. P. Demers
*Attorney, Agent, or Firm*—Mr. D. M. DeLeo

[57] ABSTRACT

Styryl and arylbutadienyl dyes are useful as laser dyes. These dyes are used in solution with a non-interfering solvent to form lasing media useful in dye lasers. Such lasers generally include a reservoir for containing the laser dye solution and a pumping energy source operably associated therewith for producing stimulated emission of the laser dye solution.

7 Claims, No Drawings

STYRYL AND ARYLBUTADIENYL DYE LASERS

BACKGROUND OF INVENTION

1. Field of Invention

This invention relates to lasers and more particularly to the use of a certain class of dyes as lasing media for organic dye lasers.

2. Description of the Prior Art

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin, et al., IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

As mentioned previously, organic dye lasers have many advantages over solid and gas lasers. However, depending upon the wavelength of lasing desired, one must choose entirely different classes of dyes to obtain the appropriate result. For example, coumarin dyes such as umbelliferone are useful in the short wavelength region, fluorescein is useful in the medium wavelength region and rhodamines such as Rhodamine 6G are useful in the longer wavelength region as are long chain cyanine dyes such as 3,3'-diethylthiatricarbocyanine iodide.

From a synthesis standpoint, it can be readily appreciated that generally, it is less expensive to manufacture various members of a single class of dyes than to manufacture several distinct classes of dyes in order to obtain the desired wavelengths of lasing. Accordingly, there is a need in the art for a class of dyes which by minor alterations thereof can be made to lase across virtually the entire visible spectrum.

SUMMARY OF INVENTION

We have found that a class of styryl and arylbutadienyl dyes are useful as lasing media. This class of dyes includes various individual dyes which, upon stimulated emission, have differing wavelengths of lasing. Thus, minor modifications of the basic class of dyes allows one to form dye lasers which will emit at any preselected region of the visible spectrum.

In dye laser apparatus, the lasing medium can be changed readily merely by removing the dye solution from the lasing cavity, cleaning the cavity and adding a new dye solution. This ease of interchange of dyes allows for great flexibility in the apparatus in that one can readily select the desired wavelength of lasing.

DESCRIPTION OF PREFERRED EMBODIMENTS

The objects of the present invention are obtained through the use, with dye lasers having a reservoir means containing a laser dye solution and a pumping energy source capable of producing stimulated emission of the solution which comprises a lasing concentration of dye in a non-interfering solvent (i.e., one that does not inhibit stimulated emission), of a styryl or arylbutadienyl dye.

The dyes useful in this invention can be represented by the structural formula:

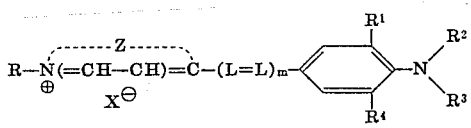

wherein:
$n$ represents an integer having a value of 0 or 1;
$m$ represents an integer having a value of 1 or 2;
L represents a methine linkage including substituted methine such as lower alkyl substituted methine having 1 to about 4 carbon atoms in the alkyl moiety, aryl (e.g., phenyl, etc.), substituted methine and the like;

R represents an alkyl radical having 1 to about 10 and preferably about 1 to about 4 carbon atoms and including substituted alkyl radicals having such substituents as sulfo, carboxy, dialkylamino (having 1 to about 4 carbon atoms in the alkyl moieties), hydroxy, alkoxy (having 1 to about 4 carbon atoms in the alkyl moiety), acyloxy, alkoxycarbonyl (having 1 to about 4 carbon atoms in the alkyl moiety) and an aryl radical; an alkenyl radical having 2 to about 10 and preferably 2 to about 4 carbon atoms and including substituted alkenyl radicals; a monocyclic aryl radical including substituted monocyclic aryl radicals, e.g., phenyl, halophenyl, (chloro, bromo, etc.), alkylphenyl (having 1 to about 4 carbon atoms in the alkyl moiety) alkoxyphenyl (having 1 to about 4 carbon atoms in the alkyl moiety), hydroxyphenyl, etc.; and an ethylene or trimethylene radical attached to the moiety Z to form a 5- or 6-membered fused heterocyclic ring, e.g., as in a 3,4-trimethylenenaphtho[2,3-d]thiazolium nucleus of the structure:

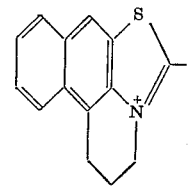

$R^2$ and $R^3$ each represent a hydrogen atom, an alkyl radical having 1 to about 7 carbon atoms, or a monocyclic aryl radical including substituted monocylic aryl radicals, e.g., phenyl, halophenyl, (chloro, bromo, etc.), alkylphenyl (having 1 to about 4 carbon atoms in the alkyl moiety) alkoxyphenyl (having 1 to about 4 carbon atoms in the alkyl moiety, hydroxyphenyl, etc.; and when $R^2$ and $R^1$ or $R^3$ and $R^4$ are taken together, represent a saturated group containing the carbon and hydrogen atoms necessary to complete a fused 5-, 6- or 7-membered heterocyclic nucleus, which together with the phenylene radical to which the nitrogen is attached, can form such radicals as julolidyl, 5-indolinyl, 6-(1,2,3,4-tetrahydroquinolyl), 3-carbazolyl, etc.;

$R^1$ and $R^4$ each represent a hydrogen atom when $R^2$ or $R^3$, respectively, is a hydrogen atom, an alkyl radical or an aryl radical;

Z represents the non-metallic atoms necessary to complete a heterocyclic nucleus containing from 5 to 6 atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienylthiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dimethylenebenzothiazole, 5-hydroxybenzothiazole, 6-hydroxybenzothiazole, etc.), a naphthothiazole nucleus (e.g., naphtho[1,2]thiazole, naphtho[2,1]-thiazole, naphtho[2,3]thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, etc.), a thianaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho[1,2]oxazole, naphtho[2,1]oxazole, naphtho[2,3]oxazole, etc.), a thiazoline nucleus (e.g., thiazoline, 4-methylthiazoline, etc.), an imidazo quinoline nucleus (e.g., 1H-imidazo[4,5-b]quinoline, etc.), a benz[e]indole nucleus (e.g., 1,1'-dimethylbenz[e]indole, etc.), a benzimidazole nucleus (e.g., 1,3-diethylbenzimidazole, 1-ethyl-3-phenylbenzimidazole, etc.), a naphthimidazole nucleus (e.g., 1H-naphth[2,3]imidazole, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 5-methylpyridine, etc.), a 4-pyridine nucleus (e.g., pyridine, etc.), an imidazo[4,5-b]quinoxaline nucleus (e.g., 1,3-dialkylimidazo[4,5-b]quinoxaline such as 1,3-diethylimidazo[4,5-b]quinoxaline, 6-chloro-1,3-diethylimidazo[4,5-b]quinoxaline, etc., 1,3-dialkenylimidazo[4,5-b]quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 6,7-dichloro-1,3-diphenylimidazo[4,5-b]quinoxaline, 1,3-diphenylimidazo[4,5-b]quinoxaline, 6-chloro-1,3-diphenylimidazo[4,5-b]quinoxaline, 1,3-bis(p-chlorophenyl)imidazo[4,5-b]quinoxaline), etc.;

X represents an acid anion such as chloride, bromide, iodide, thiocyanate, perchlorate, p-toluenesulfonate, tetrafluoroborate, etc.

Preferred materials from the standpoint of low threshold energy (i.e., minimum energy input required to initiate lasing) and/or efficiency are those dyes having the above formula wherein:

m has a value of 2;

Z represents the non-metallic atoms necessary to complete a heterocyclic nucleus selected from a 2- or 4-pyridine nucleus, a benzoxazole nucleus, a thiazole nucleus, a naphthathiazole nucleus and an imidazo quinoline nucleus;

L represents a methine linkage of the formula —CH=;

and $R^2$ and $R^3$ each represent a hydrogen atom or an alkyl radical as above. Similarly, the dyes wherein Z is a 4-pyridine nucleus and m has a value of 1 are also among preferred materials.

Other related dyes which lase are certain bridged counterparts of the dyes represented by Formula I above wherein the heterocyclic nucleus represented in part by the Z moiety is bridged back to the methine linkage represented by L. The resultant heterocyclic nuclei of this type would include, for example, bridged quinolines and thiazoles such as cyclopentaquinoline, cyclopentathiazole, etc.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-5}$ molar are employed, with solutions of from $10^{-2}$ to $10^{-4}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from 1 to about 6 carbon atoms and preferably from 2 to about 4 carbon atoms, e.g., methanol, ethanol, isopropanol, isopropanediol, butanol, etc.; and aryl alcohols such as various benzene derivatives wherein the hydroxy radical is attached directly to the aryl nucleus or is attached thereto through an alkylene moiety having from 1 to about 4 carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled LASER MEDIA CONTAINING FLUORINATED ALCOHOLS now U.S. Pat. No. 3,736,524, also heterocyclic compounds having a nitrogen heteroatom (e.g., pyridine, 2,6-dimethylpyridine, etc.), and lower alkyl ketones such as dimethylketone. Of course, combinations of liquids can be used as can other solvents known to be useful in the dye laser art. The particular solvent or combination of solvents used, of course, will be dependent in part on the solubility of the dye used.

The present lasing media can be used in a variety of laser apparatus. A laser structure particularly adapted for testing organic dye liquid laser media is that described by Sorokin, et al., *IBM Journal* (supra). For continuous operation, the present lasing media can be used in apparatus of the type described in copending application of S. A. Tuccio and O. G. Peterson, Ser. No. 117,595, filed Feb. 22, 1971, and entitled CW ORGANIC DYE LASER.

The following examples are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing.

EXAMPLE 1

The dye 2-p-dimethylaminostyryl-3,4-trimethylenenaphtho[2,3-d]thiazolium bromide is mixed in methanol to an optical density of about 2.0 in a 5 cm. dye cuvette. The cuvette is placed between two dielectric mirrors and optically excited. The dye lases at a wavelength of about 613 nm.

EXAMPLE 2

Example 1 is repeated except that the dye used is 2-p-dimethylaminostyryl-3-ethylnaphtho[2,3-d]thiazolium iodide. The dye lases at 615 nm.

EXAMPLE 3

Example 1 is repeated except that the dye used is 3-ethyl-5-phenyl-2-

{ 2-[2,3,6,7-tetrahydro-1H,5H-pyrido(3,2,1-ij)quinol-9-yl]vinyl } benzoxazolium iodide having the structure:

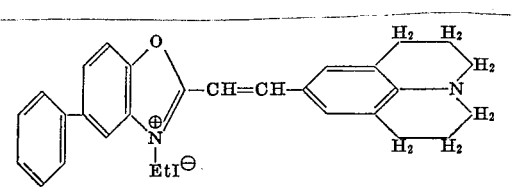

The dye lases at 594 nm.

EXAMPLE 4

Example 1 is repeated except that the dye used is 3-ethyl-4-methyl-2-

{ 2-[2,3,6,7-tetrahydro-1H,5H-pyrido(3,2-1-ij)quinol-9-yl]vinyl } thiazolium iodide and the solvent used is pyridine. The dye lases at 626 nm.

EXAMPLE 5

Example 1 is repeated except that the dye used is 3-(p-dimethylaminocinnamylidene)-4-ethyl-2,3-dihydro-1H-cyclopenta[b]quinolinium iodide. The dye lases at 775 nm.

EXAMPLE 6

Example 1 is repeated except that the dye used is 3-(p-dimethylaminocinnamylidene)-2,3-dihydro-4-methyl-1H-cyclopenta[b]quinolinium iodide. The dye lases at 775 nm.

EXAMPLES 7 THROUGH 18

The following dyes are tested as described in Example 1:

Table I

| No. | Name |
|---|---|
| 1 | 2-(4-p-dimethylaminophenyl-1,3-butadienyl)-1-ethyl-pyridinium iodide |
| 2 | 2-[4-(p-diethylaminophenyl)-1,3-butadienyl]-3-ethyl-benzothiazolium iodide |
| 3 | 2-[4-(p-diethylaminophenyl)-1,3-butadienyl]-3-ethyl-4-phenylthiazolium perchlorate |
| 4 | 2-p-dimethylaminostyryl-1-ethylnaphtho[2,3-d]thiazolium iodide |
| 5 | 2-(4-p-dimethylamino-1,3-butadienyl)-3-phenylbenzothiazolium iodide |
| 6 | 2-(4-p-dimethylaminophenyl-1,3-butadienyl)-3,3-dimethyl-1-phenylindolinium perchlorate |
| 7 | 2-p-dimethylaminostyryl-1,3-diethylnaphth[2,3]-imidazolium iodide |

Table I-Continued

| No. | Name |
|---|---|
| 8 | 2-(4-p-dimethylaminophenyl-1,3-butadienyl)1,3-diethyl-1H-imidazolo[4,5-b]quinolinium iodide |
| 9 | 4-p-diethylaminostyryl-1-ethylpyridinium iodide |
| 10 | 3-benzyl-2-p-dimethylaminostyrylbenzothiazolinium iodide |
| 11 | 2-p-diethylaminostyryl-3-β-ethoxyethylbenzothiazolium iodide |

The particular solvent used and the wavelength of lasing are indicated in Table II.

Table II

| Dye No. | Solvent | Wavelength (nm) |
|---|---|---|
| 1 | Methanol | 698 |
| 2 | Methanol | 713 |
| 3 | Methanol | 702 |
| 4 | Methanol | 615 |
| 5 | Methanol | 722 |
| 6 | Methanol | 730 |
| 7 | Pyridine | 610 |
| 8 | Methanol | 708 |
| 9 | Pyridine | 635 |
| 10 | Methanol | 614 |
| 11 | Methanol | 610 |

The invention has been described in detail with particular reference to certain preferred embodiments thereof, but it will be understood that variations and modifications can be effected within the spirit and scope of the invention.

We claim:

1. A method of producing coherent laser emission in the operation of a dye laser in the wavelength range of from about 500 to about 900 nm comprising the steps of optically pumping a dye solution to produce a population inversion in said solution, and stimulating the emission of a beam of radiation therefrom, said solution containing between about $10^{-2}$ to about $10^{-4}$ molar concentration of a lasing dye in a non-interfering solvent, said dye having the formula as follows:

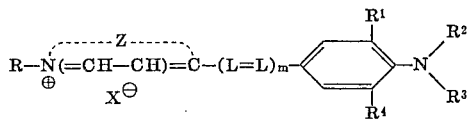

wherein:

$n$ represents an integer having a value of 0 or 1;
$m$ represents an integer having a value of 1 or 2;
L represents a methine linkage;
R represents a member selected from the group consisting of an alkyl radical having 1 to 10 carbon atoms, an alkenyl radical having 2 to 10 carbon atoms, a monocyclic aryl radical and an ethylene or trimethylene radical attached to the moiety Z to form a 5- or 6-membered fused heterocyclic ring;

$R^2$ and $R^3$ each represent a member selected from the group consisting of a hydrogen atom, an alkyl radical having 1 to 7 carbon atoms, a monocyclic aryl radical and when $R^2$ and $R^1$ or $R^3$ and $R^4$ are taken together, represent a saturated group containing the carbon and hydrogen atoms necessary to complete a fused 5-, 6- or 7-membered heterocyclic nucleus;

R¹ and R⁴ each represent a hydrogen atom when R² or R³, respectively, is a hydrogen atom, an alkyl radical or an aryl radical;

Z represents the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylindolenine nucleus, a 2-pyridine nucleus, a 4-pyridine nucleus and an imidazo[4,5-b]quinoxaline nucleus; and X represents an anion.

2. The method as described in claim 1 wherein said dye is present in a concentration of about $10^{-2}$ to about $10^{-4}$ molar.

3. The method as described in claim 1 wherein said dye is selected from the group consisting of a 2-p-dimethylaminostyryl-3,4-trimethylenenaphtho[2,3-d]thiazolium salt, a 2-p-dimethylaminostyryl-3-ethylnaphtho[2,3 d]thiazolium salt, a 3-ethyl-5-phenyl-{ 2-[2,3,6,7-tetrahydro-1H,5H-pyrido(3,2,1-ij)quinol-9-yl]vinyl } benzoxazolium salt, a 3-ethyl-4-methyl-2-{ 2-[2,3,6,7-tetrahydro-1H,5H-pyrido(3,2,1-ij)quinol-9-yl]vinyl } thiazolium salt, a 2-[4-(p-diethylaminophenyl)-1,3-butadienyl]-3-ethylbenzothiazolium salt, a 2-p-dimethylaminostyryl-1-ethylnaphtho[2,3-d]thiazolium salt, a 2-(4-p-dimethylamino-1,3-butadienyl)-3-phenylbenzothiazolium salt, a 3-benzyl-2-p-dimethylaminostyrylbenzothiazolinium salt, and a 2-p-diethylaminostyryl-3-β-ethoxyethylbenzothiazolium salt.

4. The method as described in claim 1 wherein said dye is selected from the group consisting of a 3-(p-dimethylaminocinnamylidene)-4-ethyl-2,3-dihydro-1H-cyclopenta[b]quinolinium salt, a 3-(p-dimethylaminocinnamylidene)-2,3-dihydro-4-methyl-1H-cyclopenta[b]quinolinium salt, a 2-(4-p-dimethylaminophenyl-1,3-butadienyl)-1-ethylpyridinium salt, a 2-(4-p-dimethylaminophenyl-1,3-butadienyl)-3,3-dimethyl-1-phenylindolinium salt, 1,2-p-dimethylaminostyryl-1,3-diethylnaphth[2,-3]imidazolium salt, a 2-(4-p-dimethylaminophenyl-1,3-butadienyl)-1,3-diethyl-1H-imidazolo[4,5-b]quinolinium salt, and a 4-p-diethylaminostyryl-1-ethylpyridinium salt.

5. The method as described in claim 1 wherein said dye is 2-[4-(p-diethylaminophenyl)-1,3-butadienyl]-3-ethyl-4-phenylthiazolium perchlorate.

6. A method of producing coherent laser emission in the operation of a dye laser in the wavelength range of from about 500 to about 900 nm comprising the steps of optically pumping a dye solution to produce a population inversion in said solution and stimulating the emission of a beam of radiation therefrom, said solution containing between about $10^{-2}$ to about $10^{-4}$ molar concentration of a lasing dye in a non-interfering solvent, said dye having the formula as follows:

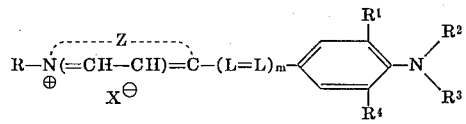

wherein:

$n$ represents an integer having a value of 0 or 1;

$m$ has a value of 2;

L represents a methine linkage of the formula —CH=;

R represents a member selected from the group consisting of an alkyl radical having 1 to 10 carbon atoms, an alkenyl radical having 2 to 10 carbon atoms, a monocyclic aryl radical and an ethylene or trimethylene radical attached to the moiety Z to form a 5- or 6-membered fused heterocyclic ring;

R² and R³ each represent a hydrogen atom or an alkyl radical having 1 to 7 carbon atoms;

R¹ and R⁴ each represent a hydrogen atom;

Z represents the non-metallic atoms necessary to complete a heterocyclic nucleus selected from the group consisting of a 2-pyridine nucleus, a 4-pyridine nucleus, a benzoxazole nucleus, a thiazole nucleus, a naphthathiazole nucleus and an imidazoquinoline nucleus; and X represents an anion.

7. A method of producing a coherent laser emission in the operation of a dye laser in the wavelength range of from about 500 to about 900 nm comprising the steps of optically pumping a dye solution to produce a population inversion in said solution, and stimulating the emission of a beam of radiation therefrom, said solution containing between about $10^{-2}$ to about $10^{-4}$ molar concentration of a lasing dye in a non-interfering solvent, said dye having the formula as follows:

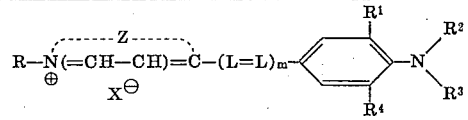

wherein:

$n$ represents an integer having a value of 0 or 1;

$m$ represents an integer having a value of 1 or 2;

L represents a methine linkage;

R represents a member selected from the group consisting of an alkyl radical having 1 to 10 carbon atoms and an ethylene or trimethylene radical attached to the moiety Z to form a 5- or 6-membered fused heterocyclic ring;

R² and R³ each represent a member selected from the group consisting of a hydrogen atom, an alkyl radical having 1 to 7 carbon atoms, a monocyclic aryl radical and when R² and R¹ or R³ and R⁴ are taken together, represent a saturated group containing the carbon and hydrogen atoms necessary to complete a fused 5-, 6- or 7-membered heterocyclic nucleus;

R¹ and R⁴ each represent a hydrogen atom when R² or R³, respectively, is a hydrogen atom, an alkyl radical or an aryl radical;

Z represents the non-metallic atoms necessary to complete a thiazole nucleus; and X⁻ represents an anion.

* * * * *

UNITED STATES PATENT OFFICE
CERTIFICATE OF CORRECTION

Patent No. 3,833,863  Dated September 3, 1974

Inventor(s) Frank G. Webster; William C. McColgin

It is certified that error appears in the above-identified patent and that said Letters Patent are hereby corrected as shown below:

Column 8; line 46, that part of the formula reading "(=CH—CH)" should read --(=CH—CH)$_n$--.

Column 9; line 60 insert after "solution", --,--.

Column 10; line 3, that part of the formula reading "(=CH—CH)" should read --(=CH—CH)$_n$--.

Column 10; line 37, that part of the formula reading "(=CH—CH)" should read --(=CH—CH)$_n$--.

Column 3; line 56, that part of the formula reading "(=CH—CH)" should read --(=CH—CH)$_n$--.

Signed and sealed this 24th day of December 1974.

(SEAL)
Attest:

McCOY M. GIBSON JR.
Attesting Officer

C. MARSHALL DANN
Commissioner of Patents